(12) United States Patent
Sigaud

(10) Patent No.: US 10,779,686 B2
(45) Date of Patent: Sep. 22, 2020

(54) NUT-CRACKER DEVICE

(71) Applicant: Philippe Sigaud, St Theoffrey (FR)

(72) Inventor: Philippe Sigaud, St Theoffrey (FR)

( * ) Notice: Subject to any disclaimer, the term of this patent is extended or adjusted under 35 U.S.C. 154(b) by 0 days.

(21) Appl. No.: 16/404,994

(22) Filed: May 7, 2019

(65) Prior Publication Data

US 2020/0146510 A1     May 14, 2020

(30) Foreign Application Priority Data

Nov. 13, 2017    (FR) ...................................... 17 71200
Nov. 9, 2018    (EP) ...................................... 18205525

(51) Int. Cl.
    *A47G 21/06*       (2006.01)
    *A47J 43/26*       (2006.01)

(52) U.S. Cl.
    CPC .................................... *A47J 43/26* (2013.01)

(58) Field of Classification Search
    CPC ...................................................... A47J 43/26
    USPC ............................................. 30/120.5, 120.2
    See application file for complete search history.

(56) References Cited

U.S. PATENT DOCUMENTS

| | | | | |
|---|---|---|---|---|
| 1,097,773 A | * | 5/1914 | Sawin ..................... | A47J 43/26 30/120.5 |
| 1,242,436 A | * | 10/1917 | Greenhaw ............... | A47J 43/26 30/120.5 |
| 1,254,119 A | | 1/1918 | Chamberlain et al. | |
| 1,791,992 A | * | 2/1931 | Wiemers ................. | A47J 43/26 30/120.5 |
| 1,987,399 A | * | 1/1935 | Harris ..................... | A47J 43/26 30/120.5 |
| 2,731,994 A | * | 1/1956 | Snell ....................... | A47J 43/26 30/120.5 |
| 3,223,133 A | * | 12/1965 | Brookey ................. | A47J 43/26 30/120.5 |

(Continued)

FOREIGN PATENT DOCUMENTS

| | | |
|---|---|---|
| DE | 3139052 A1 | 4/1983 |
| DE | 3244136 A1 | 5/1984 |
| WO | 2007113348 A1 | 11/2007 |

OTHER PUBLICATIONS

European Search Report in corresponding European Patent Application No. 18205525.5 dated Feb. 27, 2019. 4 pages.

(Continued)

*Primary Examiner* — Omar Flores Sanchez
(74) *Attorney, Agent, or Firm* — Leason Ellis LLP

(57) ABSTRACT

A device for cracking shells of nuts comprising a first jaw and a second jaw, the jaws spaced apart and arranged to move together to compress a nut N between them, the first jaw arranged to slide on an arm to amend the spacing of the jaws, the second jaw arranged to be driven along the arm towards the first jaw by a driving mechanism; and a lever; the lever arranged to operate the driving mechanism and drive the second jaw along the arm towards the first jaw; the first jaw held by a user when the lever is pulled, characterized in that the first jaw comprises an elongate first jaw member with an intermediate perforation for passage of the arm, whereas the second jaw comprises an L-shaped part with a pinion arm parallel the arm and moving through the mechanism, and an orthogonally arranged jaw arm parallel the first jaw member.

10 Claims, 7 Drawing Sheets

(56) References Cited

U.S. PATENT DOCUMENTS

| | | | | |
|---|---|---|---|---|
| 4,526,092 | A * | 7/1985 | Greenblatt | A47J 43/26 99/575 |
| 4,598,475 | A * | 7/1986 | Adams | A47J 43/26 30/120.5 |
| 4,787,307 | A | 11/1988 | Rollband | |
| 5,012,580 | A * | 5/1991 | Goulter | A47J 43/26 30/120.5 |
| 6,279,232 | B1 * | 8/2001 | Cho | A47J 43/14 30/120.1 |
| 7,011,016 | B1 * | 3/2006 | Carriker | A47J 43/26 99/573 |
| 8,833,685 | B1 * | 9/2014 | McQuinn | A47J 43/26 241/169 |
| 2018/0235389 | A1 * | 8/2018 | Storesund | A47G 21/061 |

OTHER PUBLICATIONS

French Search Report in corresponding French Patent Application No. 1771200 dated Jul. 20, 2018. 2 pages.

\* cited by examiner

NUT-CRACKER DEVICE

CROSS-REFERENCE TO RELATED PATENT APPLICATIONS

This application claims the benefit of priority of European Patent Application number 18205525.5 filed Nov. 9, 2018, and French Patent Application number 1771200 filed Nov. 13, 2017, both of which are incorporated by reference in their entireties.

FIELD OF THE INVENTION

The present invention relates to a nut-cracker device, in particular a device for cracking nuts; more particularly but not exclusively a device for cracking walnut shells without damaging the nut N meat.

BACKGROUND

Increasing focus on enjoyment of foods and technological advancements in many societies mean that pre-packaged foods are often commonplace.

However, many others enjoy fresh foods, and rituals of opening and preparing foodstuffs.

In particular nuts, such as walnuts, can be highly enjoyable to eat and the rituals of opening the nuts and accessing the meat of the nuts can be particularly satisfying for many users.

However often known nut-crackers are problematic in use, for example (and in particular reference to walnuts) often breaking apart the nut meat as well as the shell, as the user attempts to open the shell.

PRIOR ART

U.S. Pat. No. 4,787,307 (ROLLBAND) discloses a nutcracker, mounted on a base, grips a nut to be cracked between a movable piston and an adjustable anvil. The user sets the optimum cracking distance initially by lining up an index marker located on the piston and adjusting the anvil to firmly hold the opposite end of the nut. Thereafter, the user need only move the lever handle to its up position and insert the nut—no further adjustment of the anvil is necessary for similar sized nuts. The user then moves the piston a limited distance by activating the lever handle connected to the piston through a toggle joint, or by some other limited-movement arrangement. This limited movement enables the inventive nutcracker to crack the nutshell without damaging the meat inside.

DE 3 244 136 (ROMMEL et al) discloses a gripping tool with adjustable jaw opening, having two jaws, one of which is displaceable, as a clamping jaw, on a supporting rail and is lockable by means of a locking means in a selected setting, according to the invention the locking means being independent of the clamping jaw and, between the latter and the locking means, a spring member being arranged which causes, after each release of the gripping tool, the return of the clamping jaw to the starting position set by the locking means.

DE 3 139 052 (GOLDIN) discloses a device for cracking nuts or the like, which comprises two levers which can be actuated in the manner of tongs and are designed on the one hand as a handle and on the other hand as a clamping surface.

In order to achieve an optimum leverage even with nuts of different sizes and simple handling, provision is made for a connecting piece to be arranged between the levers, in which connecting piece the one lever is mounted pivotably. The connecting piece can be displaced on the other lever counter to the effect of a compression spring. In this device, the nut to be cracked is placed between the clamping surfaces which are formed by the bent ends of the two levers. The subject matter of the invention is used in nut crackers.

The present invention arose in order to overcome problems suffered by existing devices.

SUMMARY OF THE INVENTION

According to the present invention there is provided a nut-cracker device comprising:

a first jaw and a second jaw, the jaws spaced apart and arranged to move together to compress a nut between them, the first jaw arranged to slide on an arm to amend the spacing of the jaws, the second jaw arranged to be driven along the arm towards the first jaw by a driving mechanism; and a lever;

the lever arranged to operate the driving mechanism and drive the second jaw along the arm towards the first jaw; the first jaw held by a user when the lever is pulled, characterized in that the first jaw comprises an elongate first jaw member with an intermediate perforation for passage of the arm, whereas the second jaw comprises an L-shaped part with a pinion arm parallel the arm and moving through the mechanism, and an orthogonally arranged jaw arm parallel the first jaw member.

In some embodiments the first jaw comprises an elongate portion, which portion extends beyond the arm so as to provide a handle substantially orthogonal to the arm. In this way the user may find it easier to grip the first jaw, and pull the lever towards it in use. The first jaw may comprise an intermediate perforation, through which the arm passes.

The lever may be sprung. In this way the lever and second jaw may be enabled to spring back away from the first jaw after compression. In addition, or the alternative, the jaws are held together on the nut before it is cracked, and small movement towards one another causes the cracking.

It may be envisaged that the device of the present invention enables a user to place a walnut with a seam parallel the arm and squeeze the lever so as to crack the or split walnut's shell without damaging the internal nut meat.

In some embodiments the second jaw may have a limited movement range. In this way it may be envisaged that the nut shell may be compressed without the interior nut being damaged.

For example, the first jaw may be slid along the arm so as to define the outer dimension of the nut, wherein the lever is pulled towards the first jaw so the jaws are closer than the outer dimension of the nut.

The lever may be connected to the second jaw through a gearing mechanism, which mechanism may comprise a rack and pinion in some embodiments, for example in other embodiments comprising a bevel gear mechanism or worm and worm wheel mechanism, so as to translate rotary motion driven by the lever's pivot about the gear into linear movement of the second jaw, such that the second jaw travels towards the first jaw a small distance.

A spring may then act to return the gearing mechanism, or return the lever, to the original position, thereby reversing the travel of the second jaw.

The arm and the first jaw member can comprise one or more over-center type blocking means.

In some embodiments the first jaw may be provided with a catch means on the arm, for example a cam tooth arrangement between the first jaw and the arm. In this way the first jaw may be arranged to easily move along the arm, but catch when the second jaw pushes against the first jaw, for example when a nut is between the jaws and the first jaw is pushed away in an uneven manner from the second jaw so as to be offset from perpendicular.

The first jaw may comprise bearings in or at the perforation, such that the arm moves freely within the perforation, and the first jaw member moves freely on the arm. In some further embodiments the bearings may comprise a lock or catch mechanism in one direction of travel.

In some embodiments, the driving mechanism may comprise at least two geared wheels, fitted to each other in order to create a mechanical reduction. Said mechanism may comprise an L-shaped part with at least two pinion arms adapted to move through contact with the two geared wheels.

In other embodiments, the driving mechanism comprises a section of a geared wheel. As an alternative, it may comprise at least two sections of a geared wheel.

In another embodiment, the device comprises a lever rotatory travel limit with a 35° angular range from the initial position.

A preferred embodiment of the invention will now be described by way of example only and with reference to the Figures in which:

DETAILED DESCRIPTION OF FIGURES

Figure 1:
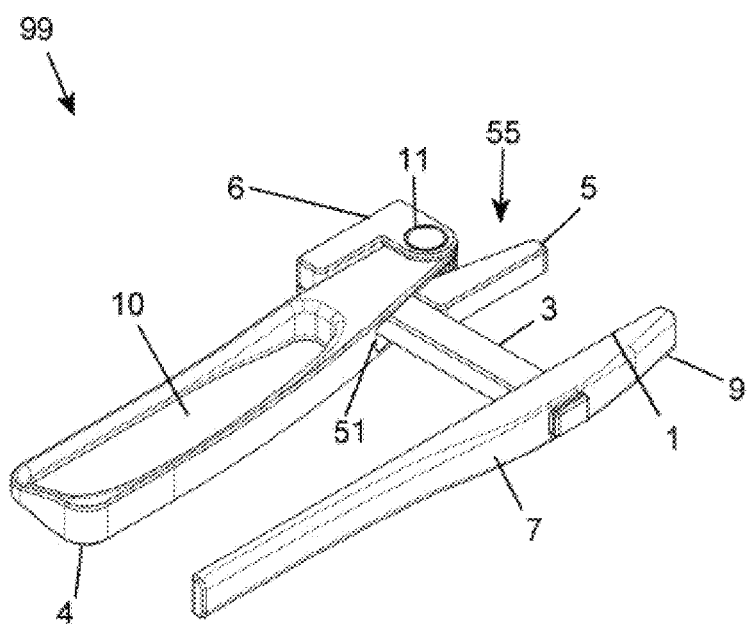
FIG. 1 shows an isometric view of an embodiment of the device according to the present invention.
Figure 2:
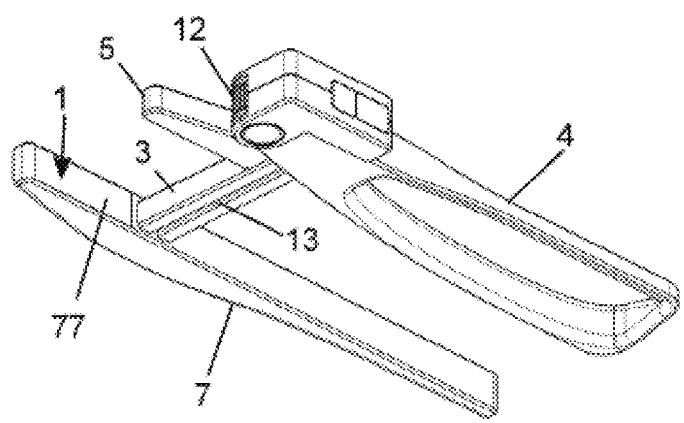
FIG. 2 shows a reverse isometric view of the embodiment of the device shown in FIG. 1.
Figure 3:
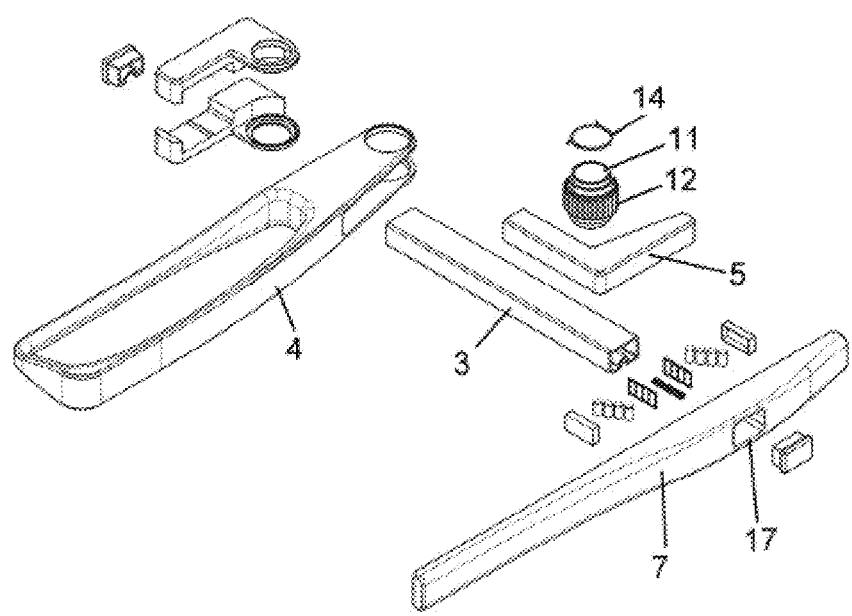
FIG. 3 shows an exploded isometric view of the embodiment shown in FIG. 1.
Figure 4:
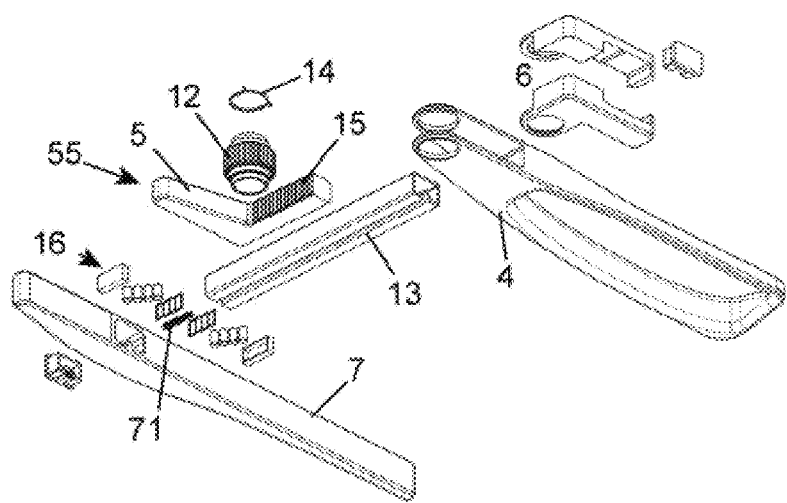
FIG. 4 shows a reverse isometric exploded view of the embodiment shown in FIG. 1.

With reference to the FIGS. 1 to 7, is presented an embodiment of the device 99 comprising a first jaw 1 and a second jaw 55, the jaws spaced apart and arranged to move together to compress a nut N between them, the first jaw 1 arranged to slide on an arm 3 to amend the spacing of the jaws, the second jaw 55 arranged to be driven along the arm 3 towards the first jaw 1 by a driving mechanism 11; and a lever 4 arranged to operate the driving mechanism 11 and drive the second jaw 55 along the arm 3 towards the first jaw 1; the first jaw 1 held by a user when the lever 4 is pulled.

In the pictured embodiment the first jaw 1 comprises an elongate member 7 with an intermediate perforation 17 for the arm 3, having a short end 9 to one side of the arm and a longer section to the opposing side of the perforation 17 and arm 3, wherein the internal surface 77 of the short end comprises the first jaw surface in use.

The second jaw 55 comprises an L-shaped part and is attached to the lever 4 through a geared driving mechanism 11, whereby when the lever 4 is turned the gear 11 rotates, moving the second jaw 55 along a channel 13 in the U-shaped arm 3 in section, cracking the nut N between the jaws. The second jaw comprises an L-shaped part with a pinion arm 15 parallel the arm 3 and moving through contact with the gear teeth 12, and orthogonally arranged to the pinion arm 15 and arm 5 forming the second jaw 55 parallel the first jaw member 7

In this way the mechanism comprises a toothed geared wheel 12 held in a housing 6, which housing 6 allows the correspondingly toothed pinion 15 extending orthogonally on the second jaw 55 to be held in contact with the wheel 12.

The wheel 12 is turned by the pivoting movement of the lever and the pinion and jaw are driven and correspondingly move out of the housing when the lever is squeezed.

The first jaw member 7 is connected to the arm 3 with a set of bearings 16 that allow it to move freely whereby if needed the first jaw member 7 can be moved along the arm 3 to securely grip the nut N, according to nut N size. The first jaw member 7 is returned to its position with a spring 71.

In use therefore the first jaw member 7 is moved into place then held in place by the user, without compression, the user have the heel of the hand against the outer face of the member 7, and fingers through a hole 10 in the lever 4.

The lever 4 and first jaw member 7 have smooth, rounded surfaces so they are comfortable to grip, even under great pressure.

The lever 4 can be made from a variety of materials to suit the style of the user but is envisaged to have chamfered edges for comfort in the hand.

The internal surfaces 77 of the short end 9 of the first jaw member 7 and the second jaw 55 are textured with a cross hatched pattern or knurled to ensure they can easily grip the nut N or seed.

The lever 4 is limited in travel by the distal end of the first jaw member, or by the proximal end 51 of the lever which abuts the arm 3 so as to limit rotatory travel, an on return abuts the housing 6. As an example, the rotatory travel limit can be a 35° angular range from the initial position.

The lever returns to its original position via a torsion spring 14 within the mechanism 11 which acts to relocate the lever 4 and the second jaw 55 on the arm 3.

The first jaw member 7 is furthermore arranged to return to an original position, through a compression spring 71.

In this way the lever 4 is arranged to travel only a short distance and return. In the pictured embodiment this distance is envisaged to be 8 mm, sufficient to crack the nut N shell without breaking the internal nut N meat.

According to one embodiment, the geared driving mechanism 11 can be made of at least two geared wheels 12, fitted to each other in order to create a mechanical reduction. The reduction facilitates the use of the nut-cracker by reducing the compression force necessary to enable the cracking of said nut.

According to another embodiment, the geared driving mechanism 11 comprises a section of a geared wheel 11*a*.

According to an alternative embodiment, the geared driving mechanism 11 comprises at least 2 section of a geared wheel 11*a* and 11*b*, arranged side-by-side. The driving mechanism 11 further comprises an L-shaped part with at least two pinion arms 15*a* and 15*b* adapted to move through contact with the two sections of a geared wheel 11*a* and 11*b*.

The first jaw member 7, the lever 4, the gears and springs are all made from metal to ensure durability.

In use:

The nut N is placed between the jaws, by sliding the first jaw 1 into a position which will hold the nut N between the jaws, ideally with the walnut N with the seam parallel to the arm 3.

The user lightly holds the long end of the first jaw member 7 and the lever 4 so as to maintain the nut N in place.

The lever 4 and the long end of the first jaw member 7 are squeezed towards each other to rotate the gear mechanism 11 and advance the second jaw 55 towards the first jaw 1 along the arm 3, to compress the nut N in the jaws and crack the shell without damaging the meat.

The first jaw member 7 and the lever 4 are released and return to their original positions.

The nut N is ready to eat.

Figure 5:
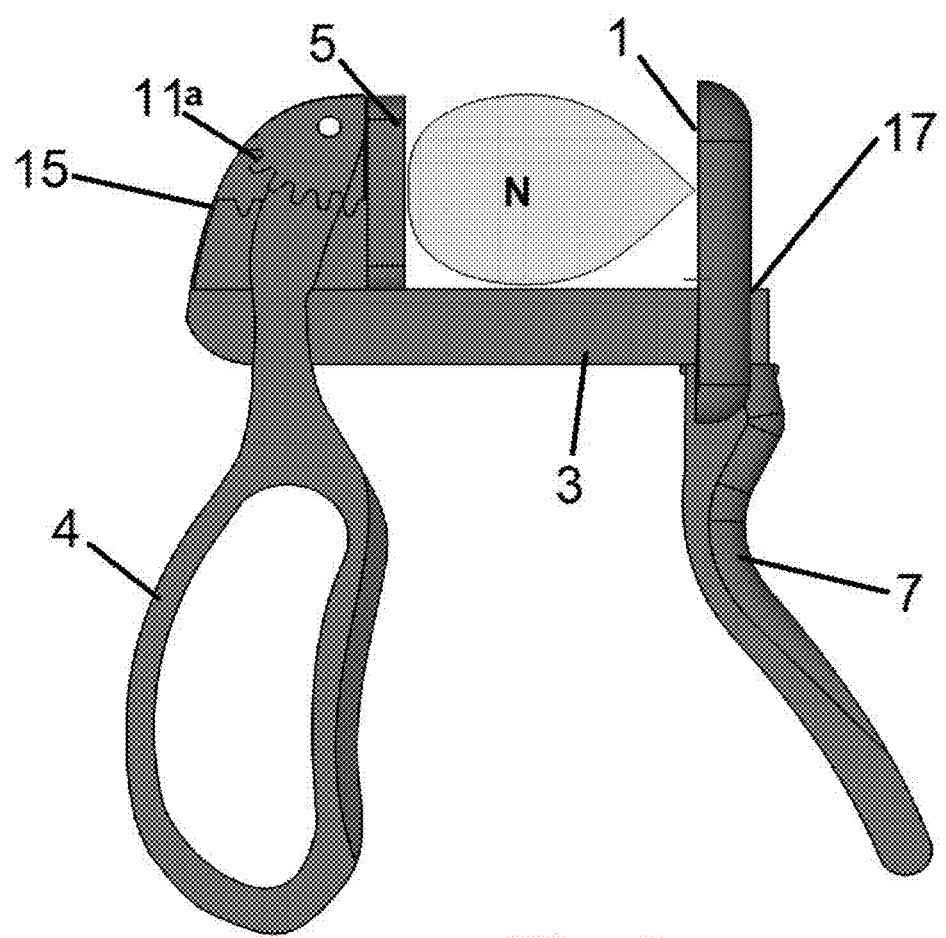
FIG. 5 shows a standard view of an alternative to the embodiment shown in FIG. 1 in an open position.
Figure 6:
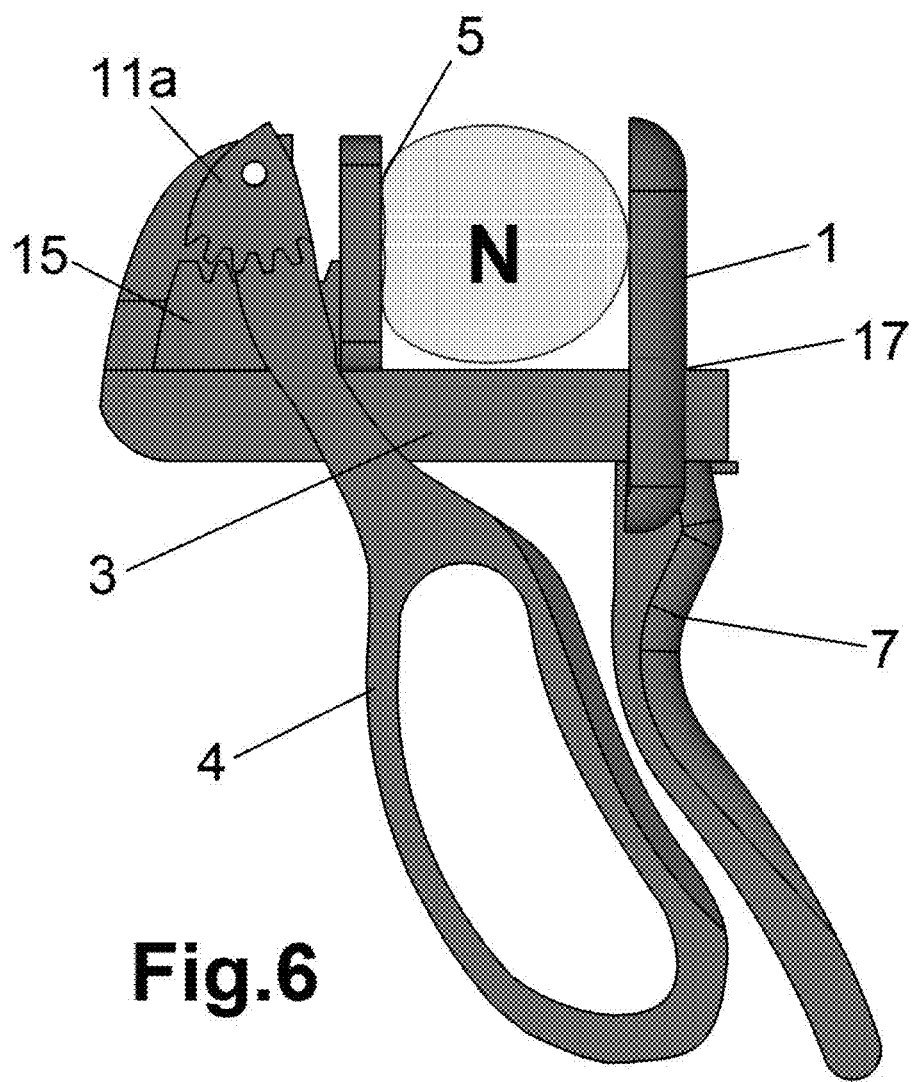
FIG. 6 shows a standard view of an alternative embodiment as shown in FIG. 5 in a closed position.

With reference to the FIGS. 5 and 6, in an alternative embodiment to the present invention, the nut-cracker device 99 enable two functional positions.

A first position, referenced as "initial position" comprises a maximal width between the jaws, and a maximal width between the first jaw member 7 and the lever 4, as shown in FIG. 5.

A second position, as described in FIG. 6, and further referred to as "locked position" comprises an amended spacing between the jaws, locking the nut N in-between the jaws consecutively to a compression applied by the user.

Figure 7:
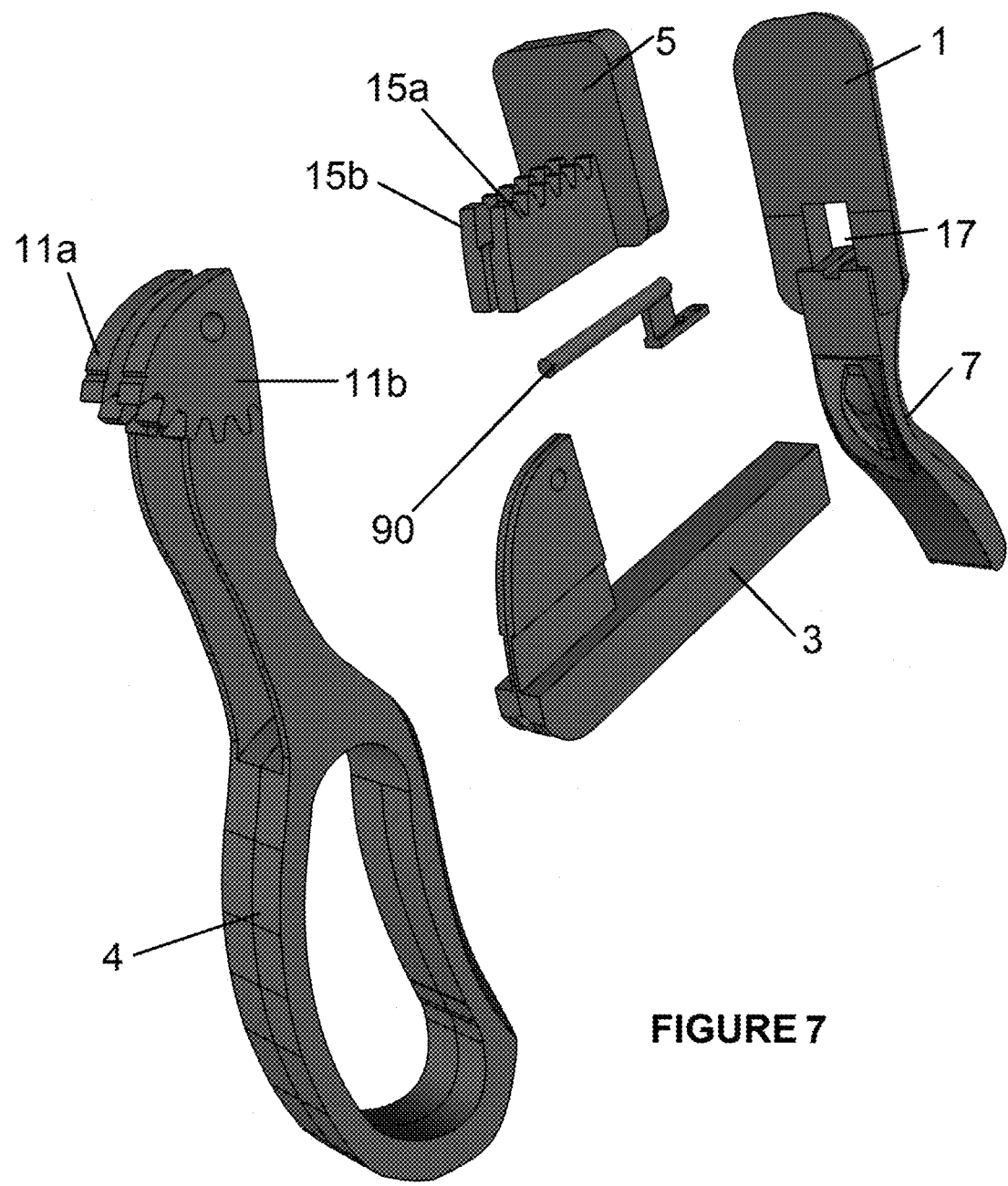
FIG. 7 shows a reverse isometric exploded view of the embodiment shown in FIG. 5.

In a particular embodiment according to FIGS. 5 to 7, the mechanism 11 further comprises a guide 90 attached to the lower side of the intermediate perforation 17 of the first jaw member 7.

The guide 90 is inserted in a slide extending horizontally through the lower part of the arm 3, enabling said arm 3 to slide more easily and according to a precise axis toward the intermediate perforation 17.

The guide 90 may allow the arm 3 to slide through the intermediate perforation 17, when amending the spacing between the jaws 55/7, until said jaws 55/7 come into contact with the nut N. The mechanism is then blocked by over-center type blocking means when the jaws 55/7 come into contact with the nut N.

When the user stops the compression after having cracked the nut N, the arm 3 may slide back more easily to its original position, following said guide 90.

The invention has been described by way of examples only and it will be appreciated that variation may be made to the above-mentioned embodiments without departing from the scope of invention as defined by the claims, in particular but not solely combination of features of described embodiments.

The invention claimed is:

1. A nut-cracker device (99) comprising a first jaw (1) and a second jaw (55), the jaws spaced apart and arranged to move together to compress a nut N between them, the first jaw (1) arranged to slide on an arm (3) to amend the spacing of the jaws, the second jaw (55) arranged to be driven along the arm (3) towards the first jaw (1) by a driving mechanism (11); and a lever (4); the lever (4) arranged to operate the driving mechanism (11) and drive the second jaw (55) along the arm (3) towards the first jaw (1); the first jaw (1) held by a user when the lever (4) is pulled, wherein the first jaw (1) comprises an elongate first jaw member (7) with an intermediate perforation (17) for passage of the arm (3), whereas the second jaw (55) comprises an L-shaped part with a pinion arm (15) parallel to the arm (3) and moving through the mechanism (11), and an orthogonally arranged jaw arm (5) parallel the first jaw member (7).

2. A nut-cracker device (99) according to claim 1 wherein the mechanism (11) comprises a toothed gear wheel (51).

3. A nut-cracker device (99) according to claim 2 wherein the gear wheel (51) is spring-biased to return.

4. A nut-cracker device (99) according to claim 1 wherein the arm (3) and the first jaw member (7) comprise over-center type blocking means.

5. A nut-cracker device (99) according to claim 1 wherein the first jaw (1) is spring-biased to return.

6. A nut-cracker device (99) according to claim 1 wherein the driving mechanism (11) comprises at least two geared wheels (12), fitted to each other in order to create a mechanical reduction.

7. A nut-cracker device (99) according claim 1 wherein the driving mechanism (11) comprises a section of a geared wheel (11a).

8. A nut-cracker device (99) according to claim 1, wherein the driving mechanism (11) comprises at least two sections of a geared wheel (11a).

9. A nut-cracker device (99) according to claim 8, wherein the driving mechanism (11) is L-shaped and includes at least two pinion arms (15a) and (15b) adapted to move through contact with the two sections of a geared wheel (11a) and (11b).

10. A nut-cracker device (99) according to claim 2 wherein the lever (4) rotatory travel limit is a 35° angular range from an initial position in which pressure is not exerted on the lever, to a maximally rotated position upon exertion of pressure.

* * * * *